United States Patent
Tomita et al.

(10) Patent No.: US 9,567,449 B2
(45) Date of Patent: Feb. 14, 2017

(54) ZINC DIACRYLATE DISPERSED IN OIL

(75) Inventors: Seisuke Tomita, Tokyo (JP); Thomas J. Kennedy, III, Wilbraham, MA (US)

(73) Assignee: NIKE, Inc., Beaverton, OR (US)

(*) Notice: Subject to any disclaimer, the term of this patent is extended or adjusted under 35 U.S.C. 154(b) by 500 days.

(21) Appl. No.: 13/459,551

(22) Filed: Apr. 30, 2012

(65) Prior Publication Data

US 2013/0289186 A1    Oct. 31, 2013

(51) Int. Cl.
| | | |
|---|---|---|
| C08L 21/00 | (2006.01) | |
| C08K 5/098 | (2006.01) | |
| A63B 37/00 | (2006.01) | |
| A63B 45/00 | (2006.01) | |

(52) U.S. Cl.
CPC ......... *C08K 5/098* (2013.01); *A63B 37/0003* (2013.01); *A63B 37/0051* (2013.01); *A63B 45/00* (2013.01)

(58) Field of Classification Search
CPC .................................................... C08K 5/098
USPC ........................................................ 524/399
See application file for complete search history.

(56) References Cited

U.S. PATENT DOCUMENTS

| | | | |
|---|---|---|---|
| 4,500,466 A | 2/1985 | Hayes et al. | |
| 5,096,201 A | 3/1992 | Egashira et al. | |
| 5,096,943 A | 3/1992 | Hashimoto et al. | |
| 5,143,957 A | 9/1992 | Hashimoto et al. | |
| 6,194,504 B1* | 2/2001 | Nagel et al. | 524/394 |
| 6,380,291 B1* | 4/2002 | von Hellens | 524/313 |
| 6,646,053 B2 | 11/2003 | Yokota et al. | |
| 6,767,940 B2 | 7/2004 | Voorheis et al. | |
| 6,939,910 B2 | 9/2005 | Nakagawa | |
| 6,977,276 B2 | 12/2005 | Henning et al. | |
| 7,025,699 B2 | 4/2006 | Beck | |
| 7,091,264 B2 | 8/2006 | Graves et al. | |
| 7,135,514 B2 | 11/2006 | Johansson | |
| 7,270,610 B1 | 9/2007 | Sullivan et al. | |
| 2003/0181558 A1* | 9/2003 | von Hellens | 524/394 |
| 2004/0092636 A1* | 5/2004 | Gajic et al. | 524/406 |
| 2008/0096693 A1 | 4/2008 | Boehm et al. | |
| 2008/0146381 A1 | 6/2008 | Kondos et al. | |

FOREIGN PATENT DOCUMENTS

| | | |
|---|---|---|
| JP | 57078875 S | 5/1982 |
| JP | 58194942 S | 11/1983 |
| JP | 63-027542 | 2/1988 |
| JP | 02-036246 | 2/1990 |
| JP | 0394782 | 4/1991 |
| JP | 04227733 | 8/1992 |
| JP | 2008056824 | 3/2008 |
| JP | 2008-280528 | 11/2008 |
| JP | 2010285630 | 12/2010 |

(Continued)

OTHER PUBLICATIONS

Definition of "Dispersion" found on Nov. 14, 2013 at http://dictionary.reference.com/browse/dispersion.*

(Continued)

*Primary Examiner* — Ling Choi
*Assistant Examiner* — Lanee Reuther
(74) *Attorney, Agent, or Firm* — Honigman Miller Schwartz and Cohn LLP

(57) ABSTRACT

A dispersion of a processing aid in oil is disclosed. Further, a method of forming the dispersion in accordance with methods for preparing rubber compositions is disclosed.

12 Claims, 1 Drawing Sheet

(56) References Cited

FOREIGN PATENT DOCUMENTS

| JP | 2011087958 A | 5/2011 |
|---|---|---|
| JP | 2011225717 | 11/2011 |
| JP | 2012062402 | 3/2012 |

OTHER PUBLICATIONS

Definition of Slurrying from thefreedictionary.com. Obtained Mar. 26, 2014 at http://encyclopedia2.thefreedictionary.com/slurrying.*

Definition of Suspension from thefreedictionary.com. Obtained Mar. 26, 2014 at http://www.thefreedictionary.com/suspension.*

Mineral Oil (Medium and Low Viscosity) prepared at the 59th JECFA (2002), published in FNP 52 Add 10 (2002) superseding specifications prepared at the 51st JECFA (1998), published in FNP 52 Add 6 (1998).

Mineral Oils (Medium- and Low-Viscosity) and Paraffin Waxes (JECFA Food Additives Series), http://www.inchem.org/documents/jecfa/jecmono/v50je04.htm, last accessed on May 7, 2013.

Scientific Opinion on Safety of Medium Viscosity White Mineral Oils . . . as a Food Addtive, published in European Food Safety Authority Journal 2013;11(1):3073.

Offshore Technology Conference 24048 entitled "Effect of Medium Oil Viscosity on Two-Phase Oil-Gas Flow Behavior in Horizontal Pipes" written by Brito et al. presented at the Offshore Technology Conference on May 6-9, 2013.

Definition of "Industrial Oils" in the Free Online Encyclopedia, http://encyclopedia2.thefreedictionary.com/Industrial+Oils, last accessed on May 7, 2013.

Heat Transfer Fluid Systems, http://www.mokon.com, last accessed Jun. 7, 2013.

International Search Report and the Written Opinion mailed Aug. 12, 2013 for PCT Application No. PCT/US2013/038562.

Office Action dated Feb. 8, 2016 in Japanese Application No. 2015-510353, 12 pages (including translation).

Notice of Allowance dated Nov. 18, 2016 in Korean Application No. 10-2014-7032044, 6 pages.

* cited by examiner

ZINC DIACRYLATE DISPERSED IN OIL

BACKGROUND

The present invention relates generally to a dispersion of a metal salt of an acrylate in oil. The disclosure also relates to rubber compositions comprising the metal salt of an acrylate in oil dispersion. Further, the disclosure generally relates to golf balls comprising a rubber composition having the metal salt of an acrylate in oil dispersion and methods of making the golf ball.

The game of golf is an increasingly popular sport at both amateur and professional levels. A wide range of technologies related to the manufacture and design of golf balls is known in the art. Such technologies have resulted in golf balls with a variety of play characteristics and durability. For example, some golf balls have a better flight performance than other golf balls, in terms of initial velocity, spin, and total distance.

Golf balls are conventionally made from various types of materials. The material selected depends upon the play characteristics desired for the finished golf ball. For example, a golfer may want a harder golf ball to provide maximum distance when struck by a driver or long-iron. In other instances, a golfer may want a softer golf ball to control the spin of the golf ball with shorter irons. The materials selected affects the play characteristics and feel of the golf ball.

The process of making golf balls sometimes is made difficult by the materials selected for specific components of the golf ball. For example, when rubber materials are selected, processing aids are often required to assist the blending and curing of a rubber composition. The processing aids added to rubber materials may be difficult to disperse uniformly throughout the rubber composition. In addition, some processing aids are difficult to process due to buildup on equipment or loss of materials through fly off during the processing of the rubber material. Thus, significant stresses are placed on processing equipment resulting in less efficient methods. Further, loss of starting material due to fly off not only results in a more expensive process for making a product comprising the starting material, but also introduces an imprecision or inaccuracy in the amount of starting material that remains in the product.

More specifically, rubber compositions may include a crosslinking agent such as a peroxide free radical initiator. Rubber compositions containing such a crosslinking agent also include a co-agent. Zinc diacrylate is one such co-agent.

Zinc diacrylate is a pulverulent that can be problematic in the preparation of the rubber composition. Due to typical particle size of this pulverulent, zinc diacrylate has a tendency to fly off into the environment during mixing resulting in loss of zinc diacrylate. The loss of material during processing requires that more material than is necessary be included in the mixing device, which results in a more expensive process.

Further, zinc diacrylate has a propensity to stick to the metal parts of the equipment. This problem is known as plating out. The loss of zinc diacrylate due to fly off or plating out introduces unnecessary challenges to the preparation of rubber compositions. The use of zinc diacrylate results in a process that is less efficient and possibly more expensive.

Therefore, there exists a need in the art for improvements in the processing of rubber compositions.

SUMMARY

In one aspect, the disclosure provides a dispersion of a processing aid in oil. In embodiments of the disclosure, the processing aid is a co-agent. The co-agent may include a metal salt of an acrylate. In other embodiments, the metal acrylate includes zinc diacrylate.

In one aspect, the disclosure relates to a rubber composition comprising a dispersion of a processing aid and oil. The processing aid may be a metal salt of an acrylate. The metal acrylate includes zinc diacrylate. Further, the zinc diacrylate and oil are prepared as a dispersion. The dispersion is prepared prior to being introduced into the rubber material. Rubber compositions containing the premixed zinc diacrylate in oil and rubber material have a more uniform distribution of the co-agent throughout the composition. The uniform distribution results in a more uniform rubber when cured.

In one aspect, a method of making a dispersion is disclosed. Particles of a metal salt of an acrylate are introduced into a mixing device. A suitable oil then is added to the particles of metal acrylate in the mixing device. The two components are mixed to form a dispersion of evenly distributed particles of the metal acrylate in the oil.

In another aspect, a method of making a rubber composition in disclosed. In embodiments of the method, a dispersion of a processing aid and oil is prepared prior to being added to rubber material. The dispersion then is introduced into the rubber material. The rubber material is further processed to form a rubber composition. Additional ingredients, such as cross-linking agents, other processing aids and fillers, may be included in the rubber composition. The rubber composition is used to form various parts of a golf ball.

In another aspect, the disclosure relates to a golf ball having one or more layers comprising a rubber composition containing the dispersion containing a processing aid in oil. In some embodiments, the golf ball core is made of the rubber material. In other embodiments, one or more core layers are made of the rubber material. In further embodiments, the mantle layer is made of the rubber material.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
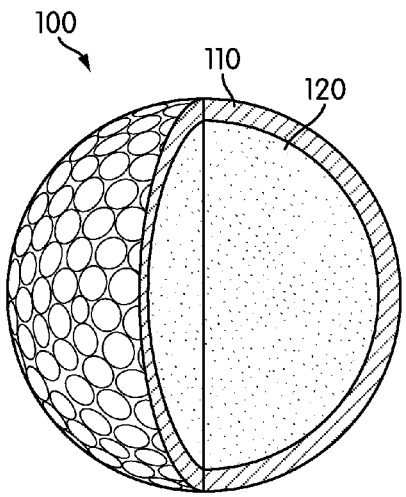
FIG. 1 shows a representative golf ball in accordance with this disclosure, the golf ball being of a two-piece construction.

Generally, the present disclosure provides for a dispersion of a processing aid in oil. Further, the present disclosure provides a method for forming a dispersion of a processing aid and oil. The dispersion of a processing aid and oil is prepared prior to inclusion in a rubber composition. The premixed dispersion is added to rubber materials during the preparation of a rubber composition. Still further, the present disclosure provides methods for preparing a rubber composition containing the premixed dispersion.

In embodiments of the disclosure, the base rubber material of the rubber composition may include polybutadiene, polyisoprene, styrene-butadiene copolymers, metallocene catalyzed polyolefin, natural rubber, and combinations thereof.

Processing aids, such as crosslinking agents and fillers, may be included in the rubber composition. The suitable crosslinking agent can be selected from the group consisting of peroxide, zinc diacrylate, magnesium acrylate, zinc methacrylate, and magnesium methacrylate.

Typically, peroxide may be used as the cross-linking agent in the rubber composition. Organic peroxides suitable as free radical initiators include, for example, dicumyl peroxide (DCP); n-butyl-4,4-di(t-butylperoxy)valerate; 1,1-di(t-butylperoxy)3,3,5-trimethylcyclohexane (TMCH); 2,5-dimethyl-2,5-di(t-butylperoxy)hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Peroxide free radical initiators are generally present in the rubber compositions in an amount within the range having a lower limit of 0.05 phr, or 0.1 phr, or 0.25 phr, or 1 part, or 1.5 phr, and an upper limit of 2.5 phr, or 3 phr, or 5 phr, or 6 phr, or 10 phr, or 15 phr.

Co-agents can be used with peroxides to improve the cure of the rubber composition. Suitable co-agents include, for example, metal salts of unsaturated carboxylic acids having from 3 to 8 carbon atoms; unsaturated vinyl compounds and polyfunctional monomers (for example, trimethylolpropane trimethacrylate); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the co-agent is zinc diacrylate (ZDA).

When the co-agent is zinc diacrylate and/or zinc dimethacrylate, the co-agent is typically included in the rubber composition in an amount within the range having a lower limit of 1 phr, or 5 phr, or 10 phr, or 20 phr, and an upper limit of 25 phr, or 30 phr, or 35 phr, or 40 phr, or 50 phr, or 60 phr. When one or more less active co-agents are used, such as zinc monomethacrylate and various liquid acrylates and methacrylates, the amount of less active co-agent used may be the same as or higher than for zinc diacrylate and zinc dimethacrylate co-agents.

Metal acrylates are available in a variety of particle sizes. When a pulverulent, such as a metal acrylate, the particle size of the pulverulent is typically 300 microns or less. Embodiments of the disclosure include metal acrylates having a number average particle size of about 100 microns or less. In some embodiments, the number average particle size of about 10 microns or less. In other embodiments, number average particle size of about 5 microns or less the More specifically, the number average particle size of the metal acrylate may range from about 0.01 microns to about 10 microns.

In addition to the curing agent and co-agent described above, one or more suitable fillers may be included in the rubber composition. Suitable fillers include zinc oxide, tungsten, barium sulfate, calcium carbonate, magnesium carbonate and alumina. In the disclosed methods, zinc oxide may be used as a filler.

Additional processing aids such as dispersants and activators may optionally be included in rubber compositions of the disclosure. In particular, zinc stearate may be added as a processing aid (e.g., as an activator).

As discussed above, certain processing aids provide challenges during the processing of rubber compositions. In particular, metal acrylates are pulverulents that may be used as processing aids in rubber composition that pose problems. More specifically, one problem associated with metal acrylate included the building up or plating out of the metal acrylate on metal surfaces of the equipment used for processing rubber compositions. In addition, pulverulents, including metal acrylates, have a tendency to be dusty and fly off into the environment resulting in loss of the material during processing. Loss of material may make the rubber composition processing more expensive. In addition, loss of starting material results in a less accurate determination of the amount of starting material remaining in the rubber composition. These disadvantages further result in poor dispersion of the metal acrylates throughout the rubber composition.

The inventors discovered that the use of a dispersion of the metal acrylate and oil avoids the disadvantages associated with using a pulverulent in the processing of rubber composition. More specifically, a dispersion of metal acrylate and oil is prepared, and then introduced into the rubber composition. By pre-mixing the metal acrylate and oil prior to introduction in the rubber composition, fly off of the metal acrylate is greatly reduced or eliminated. In addition, the plating out of the metal acrylate on the metal parts of the equipment is also greatly reduced or eliminated. A reduction in the loss of starting material results in a more accurate dosage of the metal acrylate in the rubber composition, which, in turn, may reduce the cost of preparing the rubber composition.

Further, introducing the metal acrylate as a dispersion in oil provides for more even distribution of the metal acrylate throughout the rubber composition. The more even distribution of the metal acrylate further results in a more even cure of the rubber composition.

Embodiments of the dispersion include a metal acrylate, such as zinc diacrylate, and any oil suitable for use in rubber compositions. Further, embodiments of the dispersion include oils that are suitable to be combined with metal acrylates. The oil selected for the pre-mixed dispersion can be of any suitable viscosity. In embodiments of the disclosure, the oil selected for the pre-mixed dispersion with metal acrylate has a low viscosity. The use of a low viscosity oil ensures that the metal acrylate particles are sufficiently wet to reduce or eliminate fly off and plating out during the preparation of the rubber composition.

The oil of the dispersion is selected from the group consisting of process oils, vegetable oils, vulcanized or functionalized vegetable oils, oils from animals, functionalized oils, oily plasticizers, and blends thereof. Typically, the oil of the dispersion is selected from the group consisting of process oils, vegetable oils, functionalized vegetable oils, and blends thereof.

Suitable process oils include, for example, aromatic oils, naphthenic oils, and paraffinic oils, as classified by ASTM D2226. As the skilled practitioner recognizes, such oils typically are a blend of aromatic, naphthenic, and paraffinic oils, and are classified by the predominant types of properties and characteristics of the oil. In an embodiment, the process oil is selected from paraffinic oil, naphthenic oil, and blends thereof. Aromatic oils lower viscosity of rubber compositions more than the same quantity of naphthenic oil or paraffinic oil, but may be more likely to be heavily regulated.

Aromatic oils include the Sundex® family of aromatic oils available from many sources, including American Lubricants & Chemicals, LLC, in Ohio, USA. Particularly suitable paraffinic and naphthenic oils include, for example, Sunpar® paraffinic oil, a family of oils commercially available from Sunoco, Inc. of Pennsylvania, USA and Holly-Frontier Refining and Marketing; Paralux® paraffinic oil, a family of oils commercially available from Chevron Corporation of California, USA; Unithene® naphthenic oil, a family of oils commercially available from Ergon, Inc. of Mississippi, USA; and the family of oils commercially available from Idemitsu USA under the name Diana Process Oil PS.

In some embodiments, suitable oils also include low PCA/PHA (polycyclic aromatic/polyaromatic hydrocarbon) oils, including mild extraction solvates (MES), treated distillate aromatic extracts (TDAE), and heavy naphthenic oils. Suitable low PCA oils are further disclosed in U.S. Pat. No. 6,977,276 (column 4, line 31 up to and including column 6, line 27), the entire disclosure of which is hereby incorporated herein by reference. Hydrogenated naphthenic oils, including those disclosed in U.S. Pat. No. 6,939,910, the entire disclosure of which is hereby incorporated herein by reference, also are suitable in some embodiments.

Suitable vegetable oils for use in embodiments of the disclosure include, for example, rapeseed oil, castor oil, linseed oil, soybean oil, and tung oil. Suitable vulcanized vegetable oils include, for example, semi-translucent factice, black factice, and brown factice; in particular, "F14" and "F17" sulfur vulcanized rapeseed oils, "K14D" sulfur vulcanized modified fatty acids, "Gloria 17" sulfur vulcanized rapeseed oil, "Hamburg 4" partially hydrogenated rapeseed oil, and "WP" peroxide crosslinked modified castor oil free of sulfur and chlorine, all of which are commercially available from R.T. Vanderbilt Company, Inc. of Norwalk, Conn.

Embodiments of the disclosure also use functionalized vegetable oil. Functionalized vegetable oils include, for example, epoxidized soy bean oil, epoxidized linseed oil, and epoxidized alkyl oils. One suitable epoxidized soy bean oil family is available from Arkema Inc., of Pennsylvania, USA, under the tradename Vikoflex®. Functionalized vegetable oils also include the reaction product of an epoxidized oil with a peroxide, an amine, a polyamide, or an isocyanate-containing molecule. Although the inventors do not wish to be bound by theory, epoxidized oil and functionalized oils can be incorporated into the polymeric structure of rubber composition. In any event, functionalized oils exhibit significantly less motility of the oil, thus reducing blooming of the oil, i.e., reducing separation of the oil from the rubber composition.

Functionalizing moieties typically are present in an amount between about 0.5 phr and 10 phr, more typically between about 1 phr and 5 phr, and even more particularly between about 1.25 and 3 phr. Also, the functionalizing moiety typically comprises between about 5 wt percent and about 20 wt percent, based on the weight of the functionalized oil, more typically between about 8 wt percent and about 12 wt percent, based on the weight of the functionalized oil.

Suitable oils from animals include, for example, fish oil.

In addition to the oils disclosed above, suitable oily plasticizers may also be used to prepare a dispersion with a metal acrylate. Suitable plasticizers include dioctyl adipate (DOA), dioctyl phthalate (DOP), dioctyl terephthalate (DOTP), and blends thereof.

The oil is present in the dispersion in amount ranging from about 10% to about 30% by weight relative to the metal acrylate. Further, in embodiments of the disclosure, the rubber composition may contain additional oil, such as processing oil, dispersant oil and extender oil, in addition to the oil added from the metal acrylate oil dispersion. In those embodiments, the total amount of oil in rubber, i.e., the sum of process oil, dispersant oil, and extender oil already present in the rubber, is less than about 20 phr, typically between about 1 phr and about 18 phr, and more typically between about 2 phr and about 15 phr. The different oil may be present in the rubber compositions in any combination of amounts of each oil present, so long as the total amount of oil does not exceed about 20 phr. With the guidance provided herein, the skilled practitioner will be able to select components of the rubber that limit the amount of oil present in the rubber.

In embodiments of the disclosure, the dispersion is prepared by combining the metal acrylate and oil to form a dispersion. Suitable equipment for mixing the metal acrylate with the oil in accordance with this disclosure includes a paddle mixer or paint mixer.

To prepare the dispersion, the metal acrylate having a particle size of 10 microns or less is added to the mixing equipment. The oil is then added to the metal acrylate particles in an amount of about 10% to 30% by weight relative to the zinc diacrylate. The components are then mixed until metal acrylate particles have been substantially dispersed in the oil. In some embodiments, the oil and metal acrylate dispersion may be transferred to a storage container to be used at a later time. Further, the oil and metal acrylate dispersion may be added to a rubber composition immediately after or a short time after it is prepared.

In those embodiments where the metal acrylate and oil dispersion is stored prior to use, the dispersion may be stirred or mixed prior to introduction into a rubber composition. Mixing the dispersion ensures that the metal acrylate particles are evenly distributed throughout the oil. In turn, the evenly distribution of the metal acrylate in the oil ensures the proper amount of oil and metal acrylate are introduced into the rubber material, and again, uniformly distributed throughout the rubber composition.

Once formed, the oil and metal acrylate dispersion may be mixed with rubber material to form a rubber composition in any suitable way. Similar to the preparation of the dispersion, in some embodiments of the disclosure, the oil and metal acrylate dispersion and rubber material are kneaded or melt-blended in any suitable manner. Suitable equipment for blending the rubber material with the oil and metal acrylate dispersion in accordance with this disclosure includes a twin screw extruder, a Banbury-type mixer, a two-roll mill (also known as a two-roll sheeter), or another manner of kneading the rubber material with the oil and metal acrylate dispersion. Typically, kneading with a Banbury-type mixer, a two-roll mill, or any suitable kneading device is used to blend oils and other ingredients with rubber material.

In addition to the oil and metal acrylate dispersion, the other ingredients, such as the cross-linking agent, processing aids and fillers, discussed above, are introduced into the equipment to be mixed into the rubber composition.

In embodiments of the disclosure, at least one or more of the components are heated before introducing each to the kneader, two-roll mill, or other mixing device. The rubber material should be heated to a temperature below the scorch point, and the oil and metal acrylate dispersion should be heated to a temperature below the smoke point. The other ingredients of the rubber composition can be heated, as appropriate. In this way, the time and significant energy input required for mixing the components will be reduced without reducing the quality of the product.

A golf ball may have multiple components. For example, a golf ball may have one or more core layers, optionally one or more intermediate or mantle layers, and one or more cover layers. Various types of materials may be used to form the components of a golf ball. In some embodiments, the different parts of a golf ball may be formed from the same materials. In other embodiments, each part of the golf ball is formed from different materials. The material used for each component depends upon a variety of factors. For example, the materials selected may depend on the desired play characteristics of the finished golf ball.

In embodiments of the disclosure, the base material for forming components of a golf ball may include a thermoset material. In some embodiments, the thermoset material may be a rubber material. In general, the material used to form a part of a golf ball, for example a golf ball core, may be material that can be cross-linked or cured to provide a golf ball core with specific play characteristics.

Figure 2:
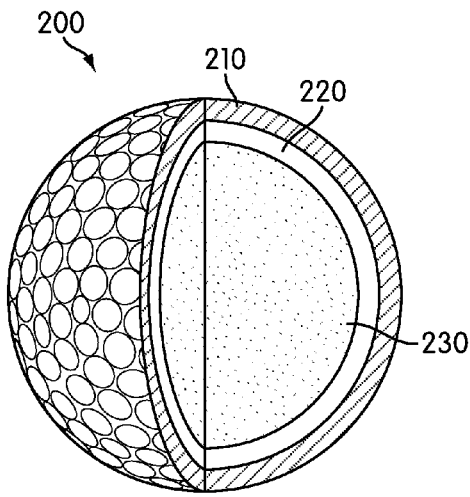
FIG. 2 shows a second representative golf ball, having a core, an inner cover layer, and an outer cover layer.
Figure 3:
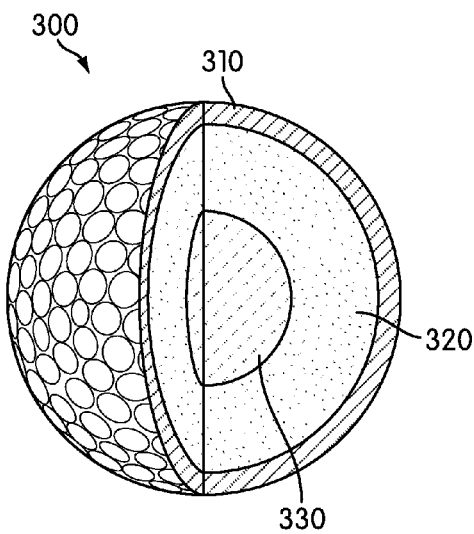
FIG. 3 shows a third representative golf ball, having an inner core, an outer core layer, and a cover layer.
Figure 4:
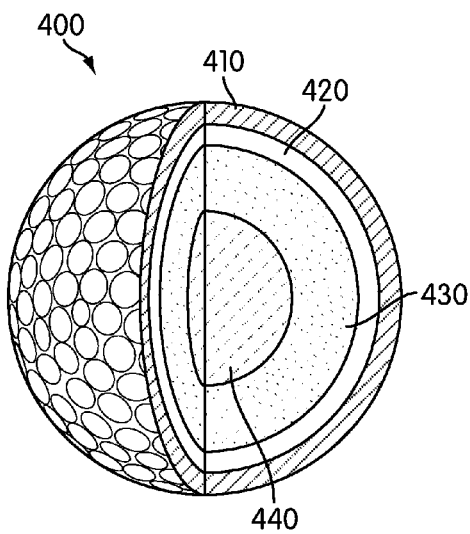
FIG. 4 shows a fourth representative golf ball, having an inner core, an outer core layer, an inner cover layer, and an outer cover layer.

In embodiments of the disclosure, the rubber composition is used in parts of a golf ball having at least 2 layers, typically in a golf ball having at least 3 layers, or pieces, and more typically in a golf ball having at least 4 layers. Typically, rubber compositions of the disclosure form the core of a golf ball having at least 3 layers, or pieces, such as in core 230 of golf ball 200 (FIG. 2); core 330 of golf ball 300 (FIG. 3); and core 440 of golf ball 400 (FIG. 4). Embodiments of the disclosure also include golf balls having a core comprising a disclosed rubber composition and having 5 or more layers.

Typically, a polybutadiene may be used as the base rubber for the golf ball core. More specifically, 1,4-cis-polybutadiene may be used as the base rubber of the golf ball core.

The skilled practitioner recognizes that polybutadiene rubber is available in various versions, including high-cis (greater than about 92 percent cis structure, typically with less than about 4 percent trans and less than about 4 percent vinyl); low-cis (as little as about 35 percent cis structure) and vinyl, all of which structures is suitable in embodiments of the disclosure.

Typically, high-cis viscosity polybutadiene rubber is used in accordance with the disclosure herein. Polybutadiene having primarily trans structure is not an elastic product, but rather is a crystalline, plastic product. Therefore, polybutadiene comprising primarily trans structure typically is not used as a rubber (elastic) product and so would not be suitable for use in this disclosure, although trace amounts of crystalline trans polybutadiene in elastomeric polybutadiene rubber may be difficult to eliminate and can be expected. The trace amounts of crystalline trans polybutadiene in elastomeric polybutadiene rubber do not adversely affect the properties and characteristics of the elastic polybutadiene rubber product.

The inventors have discovered that substantially enclosing or substantially encompassing a rubber core with a layer of HNP is particularly effective in forming a core or golf ball portion that has high coefficient of restitution (COR). Thus, embodiments of the disclosure having a core comprising a disclosed rubber composition in the core advantageously have a cover 110 (two-piece), inner cover 220 (three-piece), outer core 320 (three-piece), or inner cover 430 (four-piece) comprising an HNP.

HNPs suitable for use in embodiments of the disclosure include highly neutralized terpolymer ionomers. HPF resins such as HPF1000, HPF2000, HPF AD1024, HPF AD1027, HPF AD1030, HPF AD1035, HPF AD1040, and other members of the HPF family of HNPs produced by E. I. DuPont de Nemours and Company, are exemplary of HNPs suitably used in embodiments of the disclosure. With the guidance provided herein, the skilled practitioner will be able to identify suitable HNPs to use to substantially encompass a core comprising rubber compositions disclosed herein.

Rubber compositions of embodiments of the disclosure also can be used to form an outer core layer (320 or 430) or an inner cover layer (220 or 420), also known as a mantle layer. Because the rubber of embodiments of the disclosure is dense, a thin inner cover layer may be useful in controlling spin and providing a high moment of inertia (MOI) golf ball.

For any arrangement of layers not specifically mentioned herein, any layer may be made of any material suitable for the purpose. For example, an outer cover layer should be tough and resistant to scuffing. Thus, thermoplastic polyurethane (TPU) and thermoset polyurethane are suitable for use in outer cover layers, as are HNP and ionomers. Thermoplastic polyurethane that is not scuff resistant without more can be treated to harden the surface, such as by a surface treatment. Suitable ionomers include members of the Surlyn® family of ionomeric polymers produced by E. I. DuPont de Nemours and Company and members of the Iotek® family of products produced by ExxonMobil Chemical Corporation.

The inventors also have discovered that rubber compositions of this disclosure can be blended with HNP to form a blended material that can be used in any layer the rubber composition can be used. The blend has a high COR and is therefore particularly suited to serve as a core, particularly as an outer core, in a high performance golf ball. The blend may have a slightly higher density than the rubber composition itself, and therefore also may form a suitable mantle (inner cover) layer.

The relative weight proportions of the rubber composition to HNP in a blended product range from about 60:40 to about 99.5:0.5, typically from about 70:30 to about 99:1, and more typically from about 75:25 to about 99:1.

The rubber composition and the HNP can be mixed in the same way the rubber composition is made, i.e., on a two-roll sheeter or other kneading device. A compatibilizer or linker for the rubber and the HNP likely would be required to form a coherent blend of these components.

The rubber composition disclosed herein, and the blend of the rubber composition with HNP, also may be suitably used as an outer cover layer. If the rubber composition or the blend is used as an outer cover layer, it is typical to ensure that the included oil does not 'bloom' and separate from the rubber composition. In that case, and in any other circumstance in which it is important to maintain excellent compatibility, a compatibilizer can be employed.

Compatibilizers include maleic anhydride, silanes, and titanates. The skilled practitioner recognizes that the silanes have the general formula $Si_nH_{2n+2}$. Typically, n is less than about 8, as larger molecules are only difficultly made. The titanates are compounds known to the skilled practitioner. For example, the Ken-React® family of titanate coupling agents, available from Kenrich Petrochemical, Inc., of New Jersey, USA, are suitable titanates. Suitable titanates include monoalkoxy titanates, such as KR® TTS (Titanium IV 2-propanolato, tris isooctadecanoato-O) and KR 7 (Titanium IV bis 2-methyl-2-propenoato-O, isooctadecanoato-O 2-propanolato); oxyacetate chelate titanates, such as KR® 134S (Titanium IV bis[4-(2-phenyl)2-propyl-2]phenolato, oxoethylenediolato) and KR 138S (Titanium IV bis(dioctyl) pyrophosphato-O, oxoethylenediolato, (adduct), (dioctyl) (hydrogen)phosphite); A,B ethylene chelate titanates, such as KR® 212 (Titanium IV bis(dioctyl)phosphato-O, ethylenediolato) and KR 238S (Titanium IV bis(dioctyl)pyrophosphato-O, ethylenediolato (adduct), bis(dioctyl)hydrogen phosphite); quaternary titanates, such as KR® 138D (Titanium IV bis(dioctyl)pyrophosphato-O, oxoethylenediolato, (adduct) 2 moles of 2-N,N-dimethylamino-2-methylpropanol) and KR 158D (Titanium IV bis(butyl methyl) pyrophosphato-O, (adduct) 2 moles 2-N,N-dimethyiamino-2-methylpropanol); coordinate titanates, such as KR® 41 B (Titanium IV tetrakis 2-propanolato, adduct 2 moles (dioctyl)hydrogen phosphate) and KR 46B (Titanium IV tetrakis octanolato adduct 2 moles (di-tridecyl)hydrogen phosphite); neoalkoxy titanates, such as LICA® 01 (Titanium IV 2,2(bis 2-propenolatomethyl)butanolato, tris neodecanoato-O) and LICA 09 (Titanium IV 2,2(bis 2-propenolatomethyl)butanolato, tris(dodecyl)benzenesulfonato-O); and cycloheteroatom titanates, such as KR® OPPR (Titanium IV bis octanolato, cyclo(dioctyl)pyrophosphato-O, O) and KR OPP2 (Titanium IV bis cyclo(dioctyl)pyrophosphato-O, O). With the guidance provided herein, the skilled practitioner will be able to identify suitable titanates for use in embodiments of the disclosure.

The skilled practitioner recognizes that the layers, or pieces, also may include further components such as fillers and/or additives. Fillers and additives may be used based on any of a variety of desired characteristics, such as enhancement of physical properties, UV light resistance, and other properties. For example, to improve UV light resistance, a light stabilizer is added. Light stabilizers may include hindered amines, UV stabilizers, or a mixture thereof.

Inorganic or organic fillers can be also added to any layer. Suitable inorganic fillers may include silicate minerals, metal oxides, metal salts, clays, metal silicates, glass fibers, natural fibrous minerals, synthetic fibrous minerals or a mixture thereof. Suitable organic fillers may include carbon black, fullerene and/or carbon nanotubes, melamine colophony, cellulose fibers, polyamide fibers, polyacrylonitrile fibers, polyurethane fibers, polyester fibers based on aromatic and/aliphatic dicarboxylic acid esters, carbon fibers or a mixture thereof. The inorganic and organic fillers may be used individually or as a mixture thereof. The total amount of the filler may be from about 0.5 to about 50 percent by weight of the layer.

Other density adjusting agents, such as hollow beads that have a low density, also may be used in selected layers.

The skilled practitioner recognizes that these additives, including in particular the density adjusters, affect the performance properties and characteristics of the layer. Thus, the amount of any fillers may not exceed that amount that adversely affects the performance of the golf ball.

Flame retardants may also be used to improve the flame resistance of any layer, and particularly of thermoplastic polyurethane. Suitable flame retardants may include organic phosphates, metal phosphates, metal polyphosphates, metal oxides (such as aluminum oxide hydrate, antimony trioxide, arsenic oxide), metal salts (such as calcium sulfate, expandable graphite), and cyanuric acid derivatives (such as melamine cyanurate). These flame retardants may be used individually or as a mixture thereof, and the total amount of the flame retardant may be from about 10 to about 35 percent by weight of a polyurethane component, for example.

To improve toughness and compression rebound of thermoplastic polyurethane elastomer, the thermoplastic polyurethane elastomer may include at least one dispersant, such as a monomer or oligomer comprising unsaturated bonds. Examples of suitable monomers include styrene, acrylic esters; suitable oligomers include di- and tri-acrylates/methacrylates, ester acrylates/methacrylates, urethane, or urea acrylates/methacrylates.

The outermost layer of a golf ball also may include at least one white pigment to aid in better visibility. The white pigment may be selected from the group consisting of titanium dioxide, zinc oxide or a mixture thereof.

With the guidance provided herein, the skilled practitioner will be able to select additives for each layer or piece of the golf ball.

EXAMPLES

Ten golf ball cores are made in accordance with embodiments of the disclosure. The compositions of the golf ball cores is as follows in Table 1, and the proportions and identities of the oils are as set forth in Table 2:

TABLE 1

Compositions of Golf Balls

| Recipe | 1 | 2 |
|---|---|---|
| Rubber, pounds | 100 | 100 |
| Zinc diacrylate, phr | 23.6 | 23.6 |
| Zinc oxide, phr | 23.2 | 6.2 |
| Zinc stearate, phr | 3 | 3 |
| Barium sulfate, phr | — | 17 |
| Dicumyl peroxide, phr | 0.3 | 0.3 |
| 1,1-di(t-butylperoxy)3,3,5-trimethylcyclohexane (TMCH), phr | 0.3 | 0.3 |

TABLE 2

Oils and Proportions

| Golf Ball | Recipe | Oil type | Oil amount, phr |
|---|---|---|---|
| 1 | 1 | Naphthenic | 2.5 |
| 2 | 2 | Naphthenic | 7.5 |
| 3 | 1 | Paraffinic | 2.5 |
| 4 | 2 | Paraffinic | 7.5 |
| 5 | 1 | Aromatic | 2.5 |
| 6 | 2 | Aromatic | 7.5 |
| 7 | 1 | Vegetable Oil | 2.5 |
| 8 | 2 | Vegetable Oil | 7.5 |
| 9 | 1 | DOA | 2.5 |
| 10 | 2 | DOA | 7.5 |

The cores are prepared by curing the rubber for 8 minutes at 329° F.

In the experience of the inventors, it is anticipated that preparing the rubber composition in accordance with the embodiments of the disclosure results in little or no fly off of the metal acrylate during the preparation of the rubber composition. Further, the zinc diacrylate is more evenly distributed in the rubber composition. In addition, the plating out of the metal acrylate on the metal parts of the equipment is also greatly reduced or eliminated. A reduction in the loss of starting material results in a more accurate dosage of the metal acrylate in the rubber composition, which, in turn, may reduce the cost of preparing the rubber composition.

In addition, the above examples are prepared with zinc diacrylate in each of the number average particle size ranges disclosed. Each example is prepared having the zinc diacrylate with an average particle size of about 100 microns or less, about 10 microns or less, and about 5 microns or less.

As stated above, it is anticipated that examples having the particle size of about 100 microns or less, about 10 microns or less, and about 5 microns or less experience little or no fly off of the zinc diacrylate during the preparation of the rubber composition. Further, the zinc diacrylate is more evenly distributed in the rubber composition. In addition, the plating out of the metal acrylate on the metal parts of the equipment is also greatly reduced or eliminated. A reduction in the loss of starting material results in a more accurate dosage of the metal acrylate in the rubber composition, which, in turn, may reduce the cost of preparing the rubber composition.

Although the dispersing of the metal acrylate in oil in all recited particle size ranges provides the above discussed advantages, the effects of dispersing the metal acrylate in oil may be more readily observed for the dispersion with the metal acrylate having an average particle size of about 10 microns or less than the dispersions with the metal acrylate having an average particle size of 100 microns or less. Further, the effects of the dispersing the metal acrylate in oil may be more readily observed for the dispersion with the metal acrylate having an average particle size of about 5 microns or less than the dispersions with the metal acrylate having an average particle size of 10 microns or less. However, all examples in all particle size ranges experienced little or no fly off, more even distribution of the metal acrylate in the rubber composition, greatly reduced plating out, and more accurate dosing of the metal acrylate in compositions into which it is added.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

What is claimed is:

1. A method of making a rubber composition comprising:
   (a) forming a dispersion consisting of:
      (i) at least one metal salt selected from the group consisting of metal salts of unsaturated carboxylic acids having from 3 to 8 carbon atoms and
      (ii) an oil selected from the group consisting of vegetable oils and combinations thereof, wherein the oil (a)(ii) is present in the dispersion in an amount of about 10% to about 30% by weight based on the weight of the at least one metal salt (a)(i);
   (b) adding the dispersion of step (a) to base rubber material;
   (c) mixing the dispersion of step (a), the base rubber material, and, optionally, other ingredients to form a uniform rubber composition.

2. The method of making a rubber composition according to claim 1, further comprising the step of heating the dispersion of step (a) prior to adding the dispersion to the base rubber material.

3. The method of making a rubber composition according to claim 1, wherein the mixing step (c) is carried out using a kneading mixer, a twin screw extruder, or a two-roll mill.

4. The method of making a rubber composition according to claim 1, wherein the base rubber material is a polybutadiene rubber.

5. The method according to claim 1, wherein the at least one metal salt (a)(i) has a number average particle size of less than about 100 microns.

6. The method according to claim 5, wherein the at least one metal salt (a)(i) has a number average particle size of less than about 10 microns.

7. The method according to claim 1, wherein the at least one metal salt (a)(i) comprises a metal salt of an acrylate selected from the group consisting of magnesium, calcium, zinc, aluminum, lithium, and nickel acrylates, diacrylates, methacrylates, and dimethacrylates.

8. The method according to claim 1, wherein the at least one metal salt (a)(i) comprises zinc diacrylate.

9. The method according to claim 1, wherein the at least one metal salt has a number average particle size of less than about 5 microns.

10. The method of making a rubber composition according to claim 1, wherein the base rubber material is selected from the group consisting of polybutadiene, polyisoprene, styrene-butadiene, and natural rubbers and combinations thereof.

11. The method of making a rubber composition according to claim 1, wherein in step (a) of forming a dispersion, particles of the at least one metal salt (a)(i) are sufficiently wet to reduce or eliminate fly off and plating out during mixing step (c).

12. The method of making a rubber composition according to claim 1, further comprising molding the uniform rubber composition into a part of a golf ball.

* * * * *